July 2, 1968 F. C. REINKE 3,390,918
SILO LOADERS
Filed Sept. 15, 1967
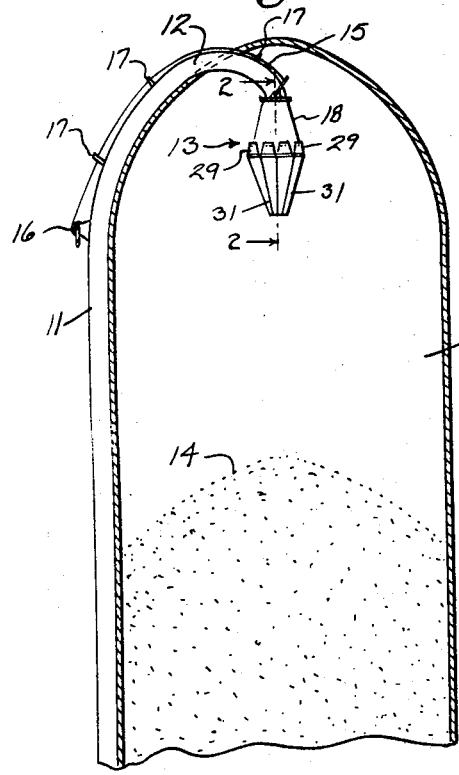
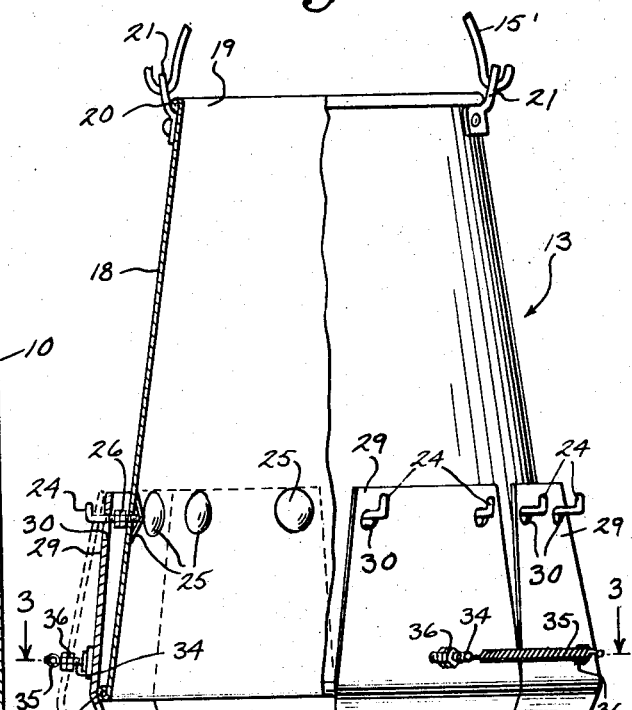
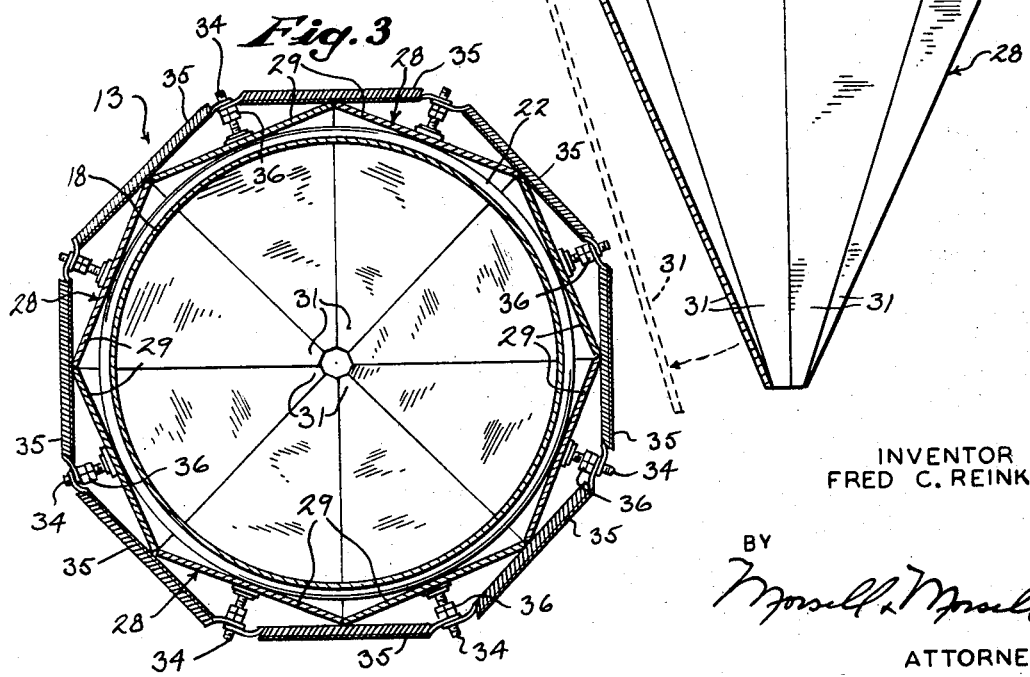
INVENTOR
FRED C. REINKE
BY
*Morsell & Morsell*
ATTORNEYS United States Patent Office 3,390,918
Patented July 2, 1968

3,390,918
SILO LOADERS
Fred C. Reinke, R.R. 1, Box 384,
Big Bend, Wis. 53103
Filed Sept. 15, 1967, Ser. No. 668,001
8 Claims. (Cl. 302—60)

ABSTRACT OF THE DISCLOSURE

A silo loader for suspension from the discharge end of a blower pipe gooseneck, the upper portion of the loader being downwardly diverging and frusto-conical in shape, and the lower portion comprising downwardly converging, tapered plates which are swingable outwardly against adjustable spring tension for discharging the ensilage into the silo.

Background of the invention

*Field of the invention.*—The present invention relates to silo filling means, and more particularly to a device for improving the operation of a conventional ensilage blower.

*Description of the prior art.*—In the use of a power-driven blower to fill a silo the blower ordinarily deposits the ensilage in a cone-shaped pile within the silo. In order to obtain a smooth, even ensilage level which will permit the effective use of mechanical unloading machinery it is usually necessary for the farmer to climb up into the silo and level the ensilage by hand, which is a tedious and time-consuming chore. In addition, when the ensilage is piled in the form of a pointed cone the force of the high power blower acting upon said piled ensilage during the filling operation causes the denser ensilage particles to be forced outwardly toward the silo perimeter, with the lighter, smaller particles remaining in the center of the silo. The result is that when the silage is removed from the silo for the purpose of feeding livestock the mixture is not of uniform density and consistency, as is desirable for high quality feed.

Devices in the form of power-driven rotatable chutes or deflectors are sometimes employed for distributing blower-delivered ensilage around a silo to promote maximum use of the silo capacity, but said rotary distributors do not eliminate the undesirable turbulent effect of the blower on the ensilage which results in feed of non-uniform consistency and quality. Moreover, said motor-driven rotary distributors are relatively expensive.

In addition to power-driven rotary-type ensilage distributors, it has been attempted in the past to suspend a series of open-ended cones, one below the other, from the end of a conventional ensilage blower in order to eliminate or minimize the objectionable turbulence created by said blower. However, even with said suspended cone arrangements the force of the air from the blower tends to disrupt the piled ensilage, and such devices have not proven entirely satisfactory for their intended purpose.

Summary of the invention

The present invention comprises an ensilage loader device adapted to be mounted beneath the end of a conventional blower to receive ensilage forcibly discharge by said blower. Said loader is provided with a plurality of spring-loaded, pivotal lower wall sections in the form of tapered plates which ordinarily converge downwardly to a closed position but which plates are designed to automatically swing open as ensilage accumulates in the loader to gently and slowly drop said ensilage onto a rounded loose pile from which it rolls and shifts evenly and uniformly to the wall of the silo.

In contrast to so-called ensilage distributors of the type including a power-driven chute or deflector, the present invention not only distributes the ensilage evenly around the silo to ensure maximum utilization of the silo capacity, but said device prevents the force of the blower from acting directly upon the piled ensilage to disrupt the mixture and consistency thereof, thereby ensuring feed of uniform consistency and quality. Moreover, the uniform mixture and distribution of said ensilage produces greater compaction, thus expelling excess air and reducing spoilage to a minimum.

A further important feature of the present invention is that it does not require a motor or other relatively expensive drive means, thus providing a unit which is both operationally superior and substantially less costly than prior devices.

Still further features of the present ensilage loader are that it is rugged and durable in construction, simple and reliable in operation, and capable of maintaining uniform density and hence uniform compaction in the silo, with the result that the silo is filled to maximum capacity with high quality silage.

Brief description of the drawing

In the drawing, wherein the same reference numerals designate the same parts in all of the views:

FIG. 1 is a vertical sectional view of a silo showing the novel loader device associated with an ensilage blower;

FIG. 2 is an enlarged side elevational view of the loader with a portion thereof broken away and shown in section; and FIG. 3 is a horizontal sectional view of said loader, taken along line 3—3 of FIG. 2.

Description of the preferred embodiment

Referring now more particularly to FIG. 1 of the drawing, illustrated therein is a cylindrical silo 10 having a conventional power-driven ensilage blower (not shown) associated therewith, said blower delivering into an elongated tube 11 which can be permanently attached to the silo exterior, the tube having a downwardly-curved gooseneck upper portion 12 extending into the silo adjacent the top and preferably at the center thereof. As is well known, in the use of a power-driven blower the forage to be stored in the silo is delivered into the lower end of the blower pipe during the filling operation and is blown upwardly therethrough under considerable pressure, the gooseneck 12 directing said ensilage downwardly to form a cone-shaped pile within the silo. As mentioned, the force of said high-powered blower acting upon said pile during the filling operation causes the denser ensilage particles to be forced outwardly toward the silo perimeter, with a resulting lack of consistency and uniformity in the feed mixture.

In accordance with the present invention there is suspended immediately below the lower end of the blower gooseneck 12 a novel loading device 13 (FIG. 1) which is designed to receive the ensilage as it is forcibly discharged from the blower pipe, said loader being designed to drop the ensilage gently onto a rounded loose pile 14 from which it rolls and shifts uniformly to the silo wall, as will be hereinafter described. In the illustrated embodiment of the invention said loader 13 is removably suspended from the blower pipe by means of a cable 15 extended through guides 17 on the blower gooseneck, there being a hand-operated winch 16 which permits said loader to be raised and lowered as desired, without anyone climbing to the topmost part of the silo to attach the loader. It is to be understood, however, that other suitable support means could be employed, and the invention is not to be limited to the particular suspension arrangement illustrated.

Referring now more particularly to FIGS. 2 and 3 of the drawing, the loader 13 includes a downwardly-diverging, frusto-conical upper hopper 18 having an open top 19 into which the lower end of the blower gooseneck 12 telescopically fits (FIG. 1), the top and bottom edges 20, 22 of said member 18 being rolled to form rounded edge flanges. Eyed brackets 21 are provided at the top of said member for the attachment of a bail 15' or other suitable means for removably securing the loader to the cable 15 or other supporting means. Preferably, the loader is designed to be quickly and easily detached from one silo and transferred to another silo when desired, thereby making it unnecessary to employ a different loader for each silo.

The downwardly flared design of the hopper member 18 in the illustrated embodiment of the present invention is intended to eliminate the friction that would occur between the descending ensilage and the loader side wall if said member were cylindrical, said flared design permitting the ensilage to fall freely by gravity during the filling operation, as will be described.

As is shown in FIG. 2, a plurality of hooks 24 having straight, laterally-projecting shanks are secured around the periphery of said hopper 18 at a point spaced above the lower end thereof. Said hooks 24 are threaded into tapered washers 25 on the inner surface of said member 18, there being lock nuts 26 threaded onto the shanks of the hooks to clampingly secure said hooks in position.

Independently suspended from said rigid hooks 24 are a plurality of elongated, relatively narrow tapered plates 28, each of which includes an upper portion 29 having a pair of enlarged openings 30 through which the hook shanks project in a manner permitting the free swinging movement and axial shifting of said plates on said hook shanks. While eight of said independent wall elements 28 are shown in the illustrated form of the present invention, it is to be understood that any desired number of similar wall members could be employed without departing from the scope of the invention.

In the illustrated embodiment the upper portions 29 of said plates 28 normally extend downwardly at a slight angle from the vertical to a point substantially even with the flanged lower edge 22 of the upper hopper 18, from which point said plates project inwardly at an angle to provide converging tapered lower portions 31. Normally said lower plate portions 31 converge to substantially close the lower end of the loader, as shown in full lines in FIG. 2, but as shown in broken lines, said plates can be urged outwardly to an open position.

Yieldably maintaining said pivotal wall members 28 in their downwardly converging, closed position are a plurality of coil springs 35 mounted exteriorly on the upper portions 29 of the plates, each of said springs having its ends anchored to threaded studs 34 projecting from said plate portions 29. Adjustment nuts 36 on said studs 34 are provided for shifting the positions of the ends of the springs in or out to regulate the tension of said springs, thus permitting said springs 35 to be adjusted and set to permit the opening of the plates 31 in response to pressure thereagainst created by a predetermined accumulation in the loader of ensilage of various types and densities. With corn ensilage, for example, including husks and other corn particles, a fair amount of tension is usually required, while if lighter ensilage such as alfalfa is being loaded the spring tension can be less. While in the preferred embodiment the springs 35 are employed, the plates could be so weighted or arranged as to hold themselves in closing position by gravity and therefore the springs could be omitted where light materials are being handled, such light materials urging the plates outwardly to open position against the action of gravity tending to close the plates.

In the operation of the novel ensilage loader, when it is desired to fill a silo by means of a power blower the loader 13 is first mounted on the lower end of the blower pipe gooseneck 12, as shown in FIG. 1 of the drawing. Due to the tension provided by the springs 35, the lower plate portions 31 of said loader are normally maintained in a downwardly-converging, closed position, as described, with the result that ensilage first discharged under pressure from the end of the blower is caught and temporarily retained in said loader, rather than being blown directly onto a pile in the silo. As said ensilage accumulates in the loader the combination of the weight thereof and the force of the blower causes said pivotal plate members 28 to begin to swing outwardly to an open position, against the tension of said springs 35 or action of gravity or weights, thus permitting the ensilage to fall freely of its own weight to the center of the silo. Even when said pivotal plates 28 are in an open position, however, they are inclined inwardly from the vertical to provide a funnel-like structure which releases the ensilage slowly and without permitting air from the blower to act upon the ensilage piled therebelow. The result is that with the present invention the turbulence of the blower is confined to the loader interior, where it is helpful in thoroughly and uniformly mixing the ensilage confined therein before said ensilage is released.

As the ensilage falls from the bottom of the loader 13 said ensilage tends to form a rounded loose pile in the silo, in contrast to the sharp-pointed cone ordinarily formed when ensilage is forcibly blown into a silo, with the result that the ensilage particles roll and shift evenly and uniformly to the wall of the silo to insure maximum compaction, thus permitting maximum utilization of the silo capacity. Moreover, as hereinabove described, due to the presence of said loader 13 in covering relationship over the end of the blower, the force and turbulence of said blower is prevented from acting directly upon the piled ensilage, thereby maintaining the desired density and consistency of said ensilage to ensure a mixture of uniform quality.

From the foregoing detailed description it will be seen that the present invention provides a novel loader for use with a conventional ensilage blower which is designed to improve the operation of the blower by providing more even distribution of the ensilage around the silo, and which device eliminates the undesirable turbulent action of the blower on the piled ensilage to provide feed of more uniform consistency and density. Moreover, the novel ensilage loader comprising the present invention is inexpensive, it is rugged and durable in construction, and it is simple and reliable and automatic in operation.

It is to be understood that while a preferred embodiment of the present invention has been illustrated and described herein, numerous variations or modifications thereof are possible within the intended scope of the invention. What is intended to be covered herein is not only the illustrated form of the invention but also any and all variations or modifications thereof as may come within the spirit of said invention, and within the scope of the following claims.

What I claim is.

1. A silo loader comprising an upper receiving hopper having an open upper end for receiving ensilage from a blower pipe and having an open lower end, suspension means on the lower portion of said hopper, and a plurality of coacting plates suspended from said suspension means and shaped to coact with one another in normally substantially closing the lower end of the receiving hopper, there being a coaction between the suspension means and plates which provides for outward swinging movement of the plates in response to pressure thereon from within the loader.

2. A silo loader as claimed in claim 1 in which the hopper is downwardly diverging.

3. A silo loader as claimed in claim 1 in which the plates are downwardly converging tapered plates.

4. A silo loader as claimed in claim 1 in which each plate has an upper suspended portion and has an inwardly-bent, downwardly-tapered lower portion.

5. A silo loader as claimed in claim 1 in which there is resilient means urging the plates to closing position.

6. A silo loader as claimed in claim 1 in which the suspension means comprises hooks at circumferentially spaced intervals around the lower portion of the hopper and in which there are enlarged openings in the upper portions of the plates for receiving said hooks to allow for the outward swinging movement.

7. A silo loader as claimed in claim 1 in which there is encircling spring means around the plates urging the plates to closing position.

8. A silo loader as claimed in claim 1 in which an upper portion of each plate has an outwardly-projecting, threaded stud, in which coil springs connect said studs, and in which there is nut means on the threaded studs for adjusting the positions of the ends of the springs on the studs.

References Cited

UNITED STATES PATENTS

| | | | |
|---|---|---|---|
| 1,787,261 | 12/1930 | Reinke | 302—60 |
| 3,078,127 | 2/1963 | Miller | 302—60 |
| 3,321,252 | 5/1967 | Dreier | 302—60 |

ANDRES H. NEILSEN, *Primary Examiner.*